United States Patent
Marinaro et al.

(10) Patent No.: US 6,336,960 B1
(45) Date of Patent: Jan. 8, 2002

(54) SYSTEM AND METHOD FOR PURGING AIR BUBBLES FROM FILTERS

(75) Inventors: Vince L. Marinaro, Sunnyvale; Ted Wakamiya, San Ramon; Eric Kent, San Jose, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/507,845

(22) Filed: Feb. 22, 2000

Related U.S. Application Data
(60) Provisional application No. 60/156,420, filed on Sep. 28, 1999.

(51) Int. Cl.$^7$ ............................................. B01D 19/00
(52) U.S. Cl. ........................... 95/266; 96/193; 96/219; 210/436
(58) Field of Search .......................... 95/241, 266, 247, 95/248; 55/421, 466; 96/155, 193, 219, 194; 210/436, 472; 118/610

(56) References Cited

U.S. PATENT DOCUMENTS

| | | | | | |
|---|---|---|---|---|---|
| 5,409,523 | A | * | 4/1995 | Haeuser | 95/266 |
| 5,480,487 | A | * | 1/1996 | Figini et al. | 118/610 |
| 5,706,854 | A | * | 1/1998 | Haynes | 137/526 |
| 5,711,876 | A | * | 1/1998 | Lee | 210/436 |
| 5,858,466 | A | * | 1/1999 | Liu et al. | 96/194 |
| 5,900,045 | A | * | 5/1999 | Wang et al. | 95/241 |
| 5,931,349 | A | * | 8/1999 | Yoo | 96/155 |
| 5,989,317 | A | * | 11/1999 | Huang et al. | 95/241 |
| 6,176,252 | B1 | * | 1/2001 | Peng | 95/262 |

* cited by examiner

*Primary Examiner*—David A. Simmons
*Assistant Examiner*—Frank M. Lawrence
(74) *Attorney, Agent, or Firm*—Foley & Lardner

(57) ABSTRACT

An air bubble purging system for filters include a venturi valve in the drain line of the filter. The venturi valve is connected to a high pressure source line so that when a high rate of flow is produced in the high pressure source line, a venturi effect is created in the venturi valve to open the venturi valve and produce a vacuum in the drain line so that air bubbles are attracted into the drain line and purged.

9 Claims, 1 Drawing Sheet

SYSTEM AND METHOD FOR PURGING AIR BUBBLES FROM FILTERS

This application claims the benefit of U.S. Provisional Application No. 60/156,420, filed Sep. 28, 1999.

BACKGROUND OF THE INVENTION

1. Field of the Invention

The invention relates generally to an air bubble purging system for filters and, more particularly, to an air bubble purging system for photoresist filters, the system having a venturi valve for creating a vacuum that aids in the purging of the air bubbles out of the photoresist filter.

2. Description of the Related Art

A photoresist filter is used in semiconductor wafer processing. The photoresist filter is used to collect impurities in the photoresist, which is typically in liquid form, before the photoresist is coated on the semiconductor wafer during a photolithography process. Impurities in the photoresist will otherwise cause defects in the processed semiconductor wafer.

Generally, the photoresist filter is replaced as part of periodic maintenance. During replacement, air bubbles are introduced and trapped within the filter. The air bubbles, if not removed, become suspended in the photoresist and will cause defects in the processed semiconductor wafer.

For this reason, it is necessary to purge the air bubbles out of the filter after filter replacement. A conventional air bubble purging system for photoresist filters is illustrated in FIG. 1. The system includes a filter housing 10 having a photoresist inlet 20, a photoresist outlet 30, and a drain line 40. The drain line 40 is connected to a common drain which is open to ambient pressure. The drain line 40 has disposed therein a shut-off valve 45 which is opened during the purging process.

Air bubbles are purged by opening the shut-off valve 45 and pumping the photoresist through the filter. Air bubbles rise to the top of the filter housing 10 with each pump stroke and are pushed out through the drain line 40. Periodically, the photoresist is coated onto a semiconductor wafer and defect monitors are used to examine the quality of the coated photoresist layer. If it is determined that the quality of the coated photoresist layer is unacceptable, the shut-off valve is kept open and more photoresist is pumped through the filter to cause additional air bubbles to be purged from the filter. This process is repeated until a coated photoresist layer of acceptable quality can be seen on the defect monitors.

SUMMARY OF THE INVENTION

The invention provides an air bubble purging system for filters that is less time consuming and wastes comparatively very little photoresist. The invention employs a venturi valve to create a vacuum to attract air bubbles to the top of the filter housing so that air bubbles can be quickly removed from the filter, requiring less pumping and waste of photoresist and faster qualification of the photoresist. In the invention, the venturi valve is disposed in the drain line of the filter and connected to a high pressure source line so that when the high pressure source is released to atmosphere and a high rate of flow appears in the high pressure source line, vacuum is created in the drain line by the venturi effect. The vacuum, in turn, suctions the air bubbles to the top surface of the filter, for easier purging.

Additional objects, features and advantages of the invention will be set forth in the description of preferred embodiments which follows.

BRIEF DESCRIPTION OF THE DRAWINGS

Embodiments of the invention are described in detail herein with reference to the drawings in which.

The accompanying drawings, which are incorporated in and constitute a part of the specification, illustrate presently preferred exemplary embodiments of the invention, and, together with the general description given above and the detailed description of the preferred embodiments given below, serve to explain the principles of the invention.

DETAILED DESCRIPTION OF THE PREFERRED EMBODIMENTS

Figure 1:
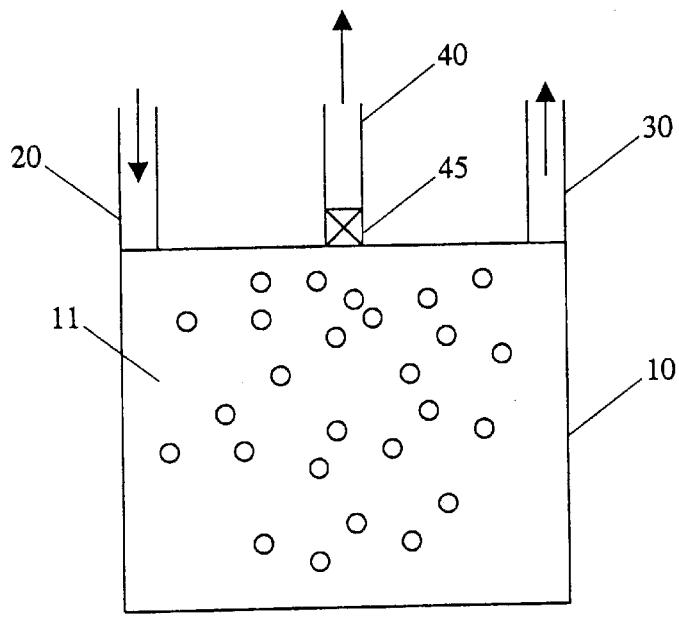
FIG. 1 is an illustration of a conventional air bubble purging apparatus.
Figure 2:
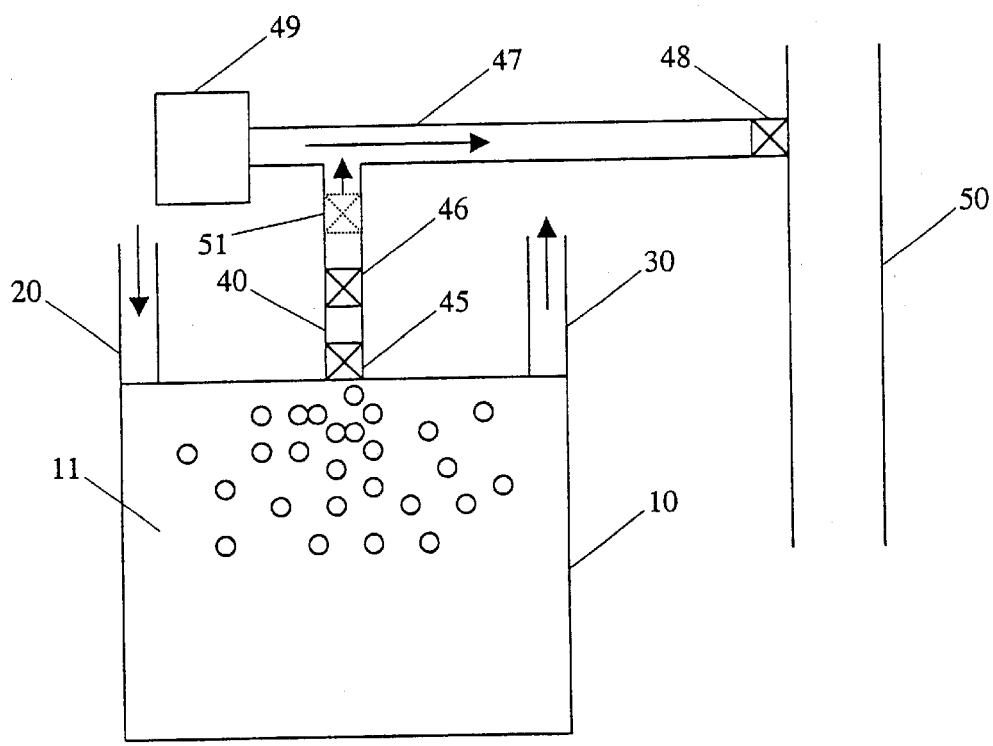
FIG. 2 is an illustration of an air bubble purging apparatus according to an embodiment of the invention.

The air bubble purging system according to the invention is illustrated in FIG. 2. The system includes a filter housing 10 having a photoresist filter 11, a photoresist inlet 20, a photoresist outlet 30, and a drain line 40. The drain line 40 includes a shut off valve 45 and a venturi valve 46, and is connected to a high pressure line 47. The high pressure line 47 is connected to a common drain 50 at ambient (i.e., atmospheric) pressure through a relief valve 48. The high pressure line 47 is preferably connected to a high pressure $N_2$ source 49, which is commonly available in semiconductor wafer processing facilities.

Air bubbles are purged from the filter housing 10 in the following manner. After the filter has been replaced, the shut-off valve 45 is opened and the relief valve 48 is opened to release the high pressure source line 47 to ambient pressure. A high flow rate results in the high pressure source line 47 causing a vacuum to be created in the drain line 40 by the venturi effect. As a result of this vacuum, the venturi valve 46 opens and air bubbles in the filter are attracted to the top surface of the filter and purged through the drain line 40, the high pressure source line 47, and a common drain 50.

In an embodiment of the invention, any type of venturi valve may be used. For example, a smaller version of the venturi valve disclosed in U.S. Pat. No. 5,706,854, entitled "Venturi Vent Valve," the contents of which are incorporated by reference herein, may be used. The selection of the pressure in the high pressure source 49, the size and parameters of the venturi valve 46 including its cracking pressure and the relief valve 48, and the diameters of the drain line 40 and the high pressure line 47 is dependent on the size of the filter. It is understood, however, that any amount of vacuum created in the drain line 40 by the venturi effect will be beneficial in the air bubble purging process.

Optionally, a check valve (shown in dotted lines at 51) may be introduced in the drain line 40 between the high pressure line 47 and the venturi valve 46 as added protection against high pressure flow being introduced into the filter. This feature is optional because the venturi valve 46 inherently has the characteristics of a check valve. For example, if the pressure on the drain side of the venturi valve 46 is greater than the pressure on the filter side of the venturi valve 46, the venturi valve will close, whereas in the reverse situation, the venturi valve will open, assuming that the pressure differential is equal to or greater than the cracking pressure.

While particular embodiments according to the invention have been illustrated and described above, it will be clear that the invention can take a variety of forms and embodiments within the scope of the appended claims.

We claim:

1. An air bubble purging system for purging air from a photoresist filter, comprising:
    a filter housing having an inlet, and a purge port;
    a drain line;
    a filter disposed in said filter housing for filtering a photoresist;
    a high pressure line connected to a valve of high pressure gas,
    a venturi valve disposed in the drain line, the drain line connected on a first side of the venturi valve to the filter housing purge port and on a second side of the valve to said high pressure line for producing a low pressure on the second side of the venturi valve to open the valve and to cause air bubbles trapped in the photoresist within the filter to be purged through the drain line while said photoresist flows from said inlet, through said filter and to said outlet.

2. The system according to claim 1, wherein the venturi valve has a cracking pressure and the venturi valve opens when the pressure on the first side of the valve is greater than the pressure on the second side of the valve by at least the cracking pressure, but otherwise remains closed.

3. The system according to claim 1, further comprising a shut-off valve disposed in the drain line between the venturi valve and the filter housing, the shut-off valve being opened when air bubbles are purged through the drain line.

4. The system according to claim 3, wherein the high pressure line is a high pressure inert gas line.

5. The system according to claim 3, wherein the high pressure line is a N2 line.

6. The system according to claim 3, further comprising a check valve disposed in the drain line between the high pressure line and the venturi valve.

7. The system according to claim 1, wherein the high pressure line includes a relief valve which, when opened, produces a high rate of flow through the high pressure line and the low pressure on the second side of the valve.

8. A method of purging air bubbles from a photoresist filter disposed in a housing, said housing having an inlet, an outlet and a purge port, wherein the purge port is connected to a drain line and the drain line is connected to a high pressure line, said method comprising the steps of:
    positioning a venturi valve between the filter housing and the drain line;
    producing a high rate of flow in the high pressure line to create a low pressure in the drain line so as to cause the venturi valve to open and thus cause air bubbles in the filter to be purged through the drain line; and
    pumping a photoresist from said inlet, through said filter and to said outlet.

9. The method according to claim 8, wherein the step of producing includes the step of opening a relief valve disposed in the high pressure line to release part of the high pressure to atmosphere.

* * * * *